United States Patent [19]

Poiesz

[11] Patent Number: 4,768,940
[45] Date of Patent: Sep. 6, 1988

[54] TUBE WALL THICKNESS MEASURING DEVICE AND EXTRUSION APPARATUS WITH THE DEVICE

[75] Inventor: Mattheus J. Poiesz, Hardenberg, Netherlands

[73] Assignee: Wavin BV, Swolle, Netherlands

[21] Appl. No.: 844,208

[22] Filed: Mar. 26, 1986

[30] Foreign Application Priority Data

Mar. 26, 1985 [NL] Netherlands .................. 8500882

[51] Int. Cl.⁴ .................. B29C 47/92; G01B 17/02
[52] U.S. Cl. .................. 425/169; 73/622; 425/141; 425/377
[58] Field of Search .......... 425/135, 141, 169, 376 R, 425/377; 73/622, 623, 624, 625, 627, 628, 629, 632, 637, 638, 634, 641; 43/141

[56] References Cited

U.S. PATENT DOCUMENTS

| | | | |
|---|---|---|---|
| 3,892,043 | 7/1975 | Bonikowski | 425/141 |
| 3,955,425 | 5/1976 | Corneau | 73/622 |
| 4,137,025 | 1/1979 | Graves et al. | 425/141 |
| 4,137,028 | 1/1979 | Reitemeyer | 425/141 |
| 4,328,708 | 5/1982 | Bagwell | 73/622 |
| 4,339,404 | 7/1982 | Upmeier et al. | 425/141 |
| 4,551,289 | 11/1985 | Schwab et al. | 425/141 |
| 4,586,379 | 5/1986 | Burkhardt | 73/622 |

Primary Examiner—Hoag: Willard E.
Attorney, Agent, or Firm—A. Robert Theibault

[57] ABSTRACT

A device for measuring the wall thickness of an extruded tube by means of ultrasonic pulses comprises a tube wall thickness measuring instrument being rotatable about the circumference of the tube and being connected to an arm extending in a plane perpendicular to the tube. The arm is hingedly connected in said plane to a ring perpendicular to the axis of the tube and concentrically about the tube. The arm bears a weight outside said ring. An adjustable pressure element, such as a spring or preferably a two way operable air cylinder, acts upon the arm.

The measuring element may engage two supporting faces, the angle between the supporting faces being adjustable.

Furthermore a detachable fixing element, such as a magnet, engages the arm so that the arm can be disconnected from the magnet and may be moved from the plane perpendicular to the tube.

The wall thickness is measured only by means of one echo coming from the inner wall of the tube when an ultrasonic pulse emitted by the device hits said wall.

15 Claims, 2 Drawing Sheets

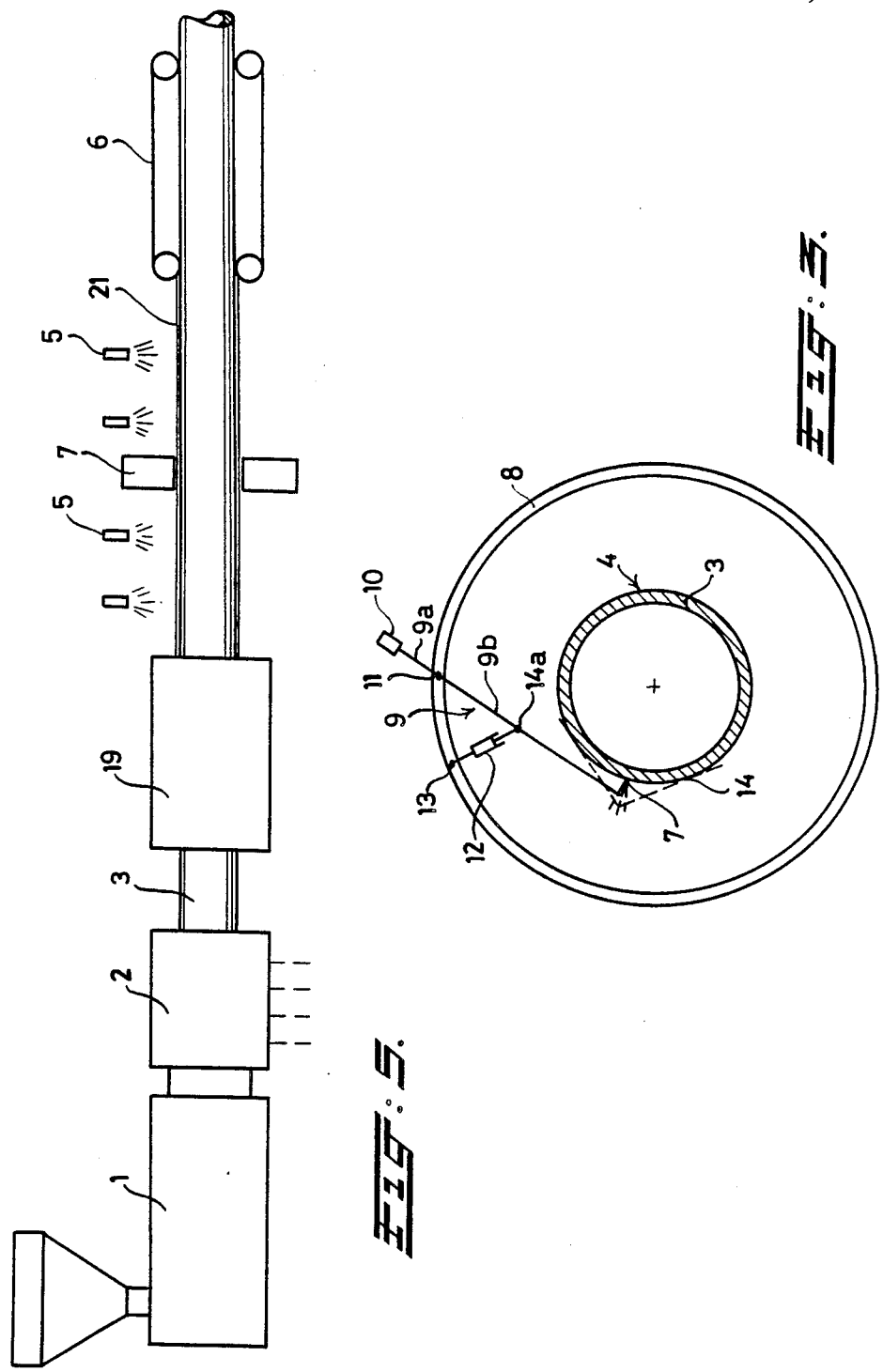

TUBE WALL THICKNESS MEASURING DEVICE AND EXTRUSION APPARATUS WITH THE DEVICE

BACKGROUND OF THE INVENTION

The invention relates to a device for measuring the wall thickness of an extruded tubular section during extrusion, comprising a tube wall thickness measuring instrument being rotatable about the periphery of the tube, and regulating means for causing the measuring instrument to be pressed against the wall of the tubular section.

Such a device for measuring the wall thickness of an extruded tubular section is known and presents the advantage that during the extrusion the wall thickness of the extruded tubular section can be measured continuously and on the basis of such measurements measures can be taken to prevent an extruded tubular section with an incorrect wall thickness from being obtained, which leads to undesired material consumption.

In this known device for measuring the wall thickness of an extruded tubular section the measuring instrument is fitted hingedly on the end of an arm. This arm can itself pivot in a plane parallel to and through the axis of the tube, and said hinge is fastened in a guide ring extending perpendicular to the axis of the tube and concentrically about a tubular section to be extruded, so that the hinge can turn about the tubular section. By means of a spring, the measuring instrument and a supporting point situated upstream of the measuring instrument are pressed against the wall of the tubular section.

This known device presents the disadvantage that gravity has a great influence on the measurement results. For, in practically all extrusion apparatus the axes of the tubes are positioned horizontally, which means that at one moment the measuring instrument is lying below the extruded tubular section, in which case the pressure force is opposed to the force of gravity, while some time later the measuring instrument is above the extruded tubular section, where the pressure force and the force of gravity are in fact working in the same direction.

This means that the difference in application force of the measuring instrument is twice the weight of the measuring instrument itself and half the arm, so that the maximum pressure force with which the measuring instrument has to be pressed against the wall of the tubular section must be more than said difference. In many cases this has proved to be too much, so that the measuring instrument is damaged or the extruded tubular section is deformed and in any case the measurements are not accurate enough, while in certain cases breakdowns may even occur.

Another problem is that in this known device the measuring instrument is supported on the wall of the tube by four supporting elements fixed relative to one another, so that angular rotation, out-of-true settings and the like which are generally due to wear and/or jamming of points of rotation or hinge points mean that all the supporting elements do not always rest on the wall of the tubular section, which gives rise to faulty measurements.

SUMMARY OF THE INVENTION

It is a primary object of the invention to provide a device of the abovementioned type in which these disadvantages are not found.

This object is achieved according to the invention in that the means for causing the measuring instrument to be pressed against the wall of the tubular section are designed in such a way that during rotation the measuring instrument is able to press with an essentially uniform force vertically against the wall of the tubular section over the whole periphery of the section.

By using such means for causing the measuring instrument to be pressed against the wall of the tubular section, the measuring instrument presses constantly with the same pressure force against the extruded tubular section, which means that damage to the measuring instrument or deformation of the tube or insufficiently accurate measurements or breakdowns are out of the question.

It is particularly advantageous to connect the measuring instrument to an arm which runs in a plane at right angles to the tubular section and is connected in said plane to a ring extending at right angles to the axis of the tube and concentrically about a tubular section, said arm bearing a weight outside the ring, and with an adjustable pressure element being present to act upon the arm.

Through the use of such an arm with a weight which serves as a counterweight, the arm system can be balanced about a hinge point, in which case an adjustable pressure element, for example a light spring, is sufficient to keep the measuring instrument pressed against the wall of the tube.

It is particularly advantageous for the pressure element to be hingedly connected to the arm and the ring.

The pressure element is expediently a spring, but is preferably a two-way operable air cylinder. Such a two-way operable air cylinder has the great advantage that the pressure force can be set in a simple manner and this pressure force does not depend on the degree of compression of a spring or the like. Moreover, when the measuring instrument is not in use, for example during starting up of an extrusion plant, but also when for certain reasons which will be discussed later it is not working in conjunction with the wall of the tubular section, the measuring instrument can be pressed outwards away from the wall of the tube, so that it is possible to work without risk of damage to the measuring instrument. As soon as the extrusion is running efficiently and it is sensible to measure the wall thickness, the operators can put the device into operation by acting upon the two-way operable air cylinder. It is even possible for this to be a built-in program point in the starting-up procedure which is carried out automatically by the extruder.

The measuring instrument works particularly advantageously with supporting faces situated on either side thereof, in which case the angles α formed by the two supporting faces and the measuring instrument can be regulated.

The supporting faces in the form of two fingers can scissor outwards or inwards, and the measuring instrument can thus be moved towards or away from the wall of the tubular section.

The position of the supporting faces in the form of fingers can efficiently regulate the position of the measuring instrument, by means of, for example, a gear wheel-gear rack construction.

The measuring instrument works particularly advantageously together with a detachable fixing element to make it possible to move the measuring instrument completely away from the wall of the tube in the direction of the axis of the tube, said detachable fixing element preferably being a magnet.

Such a fixing element has the advantage that the arm bearing the measuring instrument can be held in a plane vertical to the axis of the tube, but when the tube exerts a greater axial force on the measuring instrument than that which the fixing element, preferably a magnet, can absorb, the arm is moved from the vertical plane without damage to the tubular section of the measuring instrument. When the fault which has occurred has been eliminated, the fixing element, preferably a magnet, pulls the arm back into the desired position again and accurate measurements can again take place.

BRIEF DESCRIPTION OF THE DRAWINGS

FIG. 3 shows the same device as that shown if FIG. 2, but in section;

FIG. 5 is a schematic representation of an extrusion apparatus provided with a device for measuring the wall thickness according to the invention.

DESCRIPTION OF THE PREFERRED EMBODIMENTS

Figure 1:
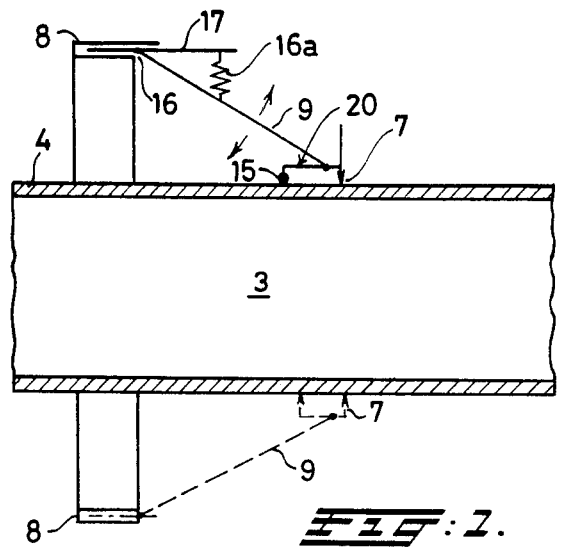
FIG. 1 shows schematically a known device for measuring the wall thickness of the extruded tubular section.
Figure 2:
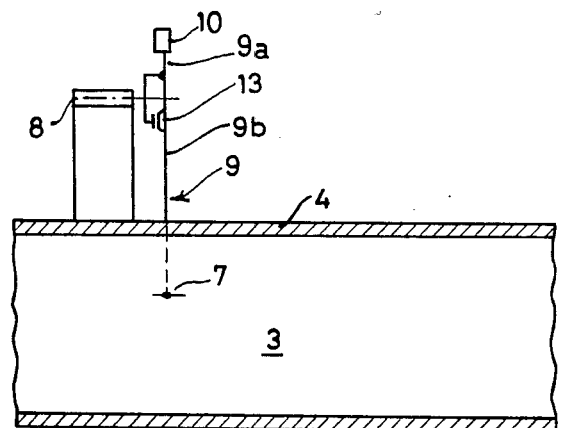
FIG. 2 shows schematically a view of a device according to the invention.
Figure 4:
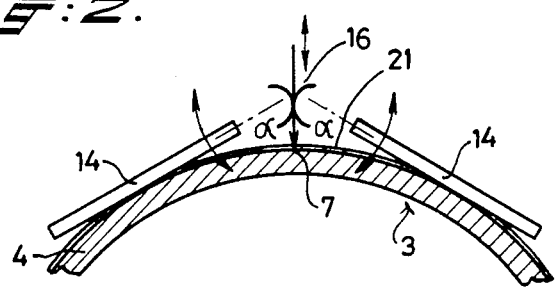
FIG. 4 shows a detail of the device according to FIG. 2.

FIG. 1 shows a known device for measuring the wall thickness of an extruded tubular section during extrusion. This device comprises a tube wall thickness measuring instrument 7 which is rotatable about the periphery of a tubular section 3 and which, by means of ultrasonic waves, measures the wall thickness of the tubular section at various points spread over the periphery of the tubular section. This known measuring instrument 7 is connected to an arm 9 which is connected by means of a hinge connection 18 to a revolving guide ring 8 which extends concentrically round a tubular section. For support of the wall thickness measuring instrument 7, it is connected to a support 15 situated upstream of the wall thickness measuring instrument 7. The arm 9 is connected by means of a hinge connection 20 to a connection strip between supporting element 15 and the wall thickness measuring instrument 7. The arm 9 is also connected by means of a spring 16a to an arm 17 to which the arm 9 is connected by means of hinge connection 18. Setting of the spring force ensures that the wall thickness measuring instrument 7 rests on the outside wall 4 of the tubular section 3.

Moving the arm 17 in the guide ring 8 will cause the wall thickness measuring instrument 7 to rotate about the periphery of the tubular section.

In the position shown in FIG. 1 the pressure force of the wall thickness measuring instrument 7 acts upon the outside wall 4 of the tube in the same direction as the force of gravity.

In the opposite position, shown by dotted lines, the force of gravity will, however, work in a direction opposed to the pressure force exerted by the spring 16.

This often leads in practice to damage to the wall thickness measuring instrument 7 or deformation of the tubular section 3, or damage to the outside wall 4 of the tubular section, or a fault or insufficiently accurate measurement of the wall thickness.

As one can see, the arm 9 extends in a plane through the axis of the tubular section 3.

In the device according to the invention the above-mentioned disadvantages are eliminated in that the arm is made to extend in the plane of the guide ring 8, which extends essentially at right angles to the axis of the tube. The arm 9 is also connected here by means of a hinge connection 11 to the guide ring 8.

However, the arm 9 here consists of a part 9b situated between hinge connection 11 and measuring instrument 8 and a section 9a of the arm 9 outside the guide ring 8, on which a counterweight 10 is fastened. Through the correct selection, the arm 9 can be balanced about the hinge point 11. By means of a pressure element 12, for example a spring, one can ensure uniform pressing of the measuring instrument 8 against the outside wall 4 of the tubular section 3.

The pressure element 12 can consist of a spring, but this pressure element advantageously consists of a two-way operable air cylinder which is hingedly connected on the one side by means of hinge connection 13 to the ring 8 and on the other side by means of hinge connection 14a to the arm 9. By means of such a two-way operable air cylinder, the pressure force exerted by the pressure element 12 can be accurately set and this force does not depend on the extent of compression of, for example, a spring.

In addition, with the aid of such a two-way operable air cylinder it is possible through reversal of the air feed and air discharge to move the arm 9 and thus the measuring instrument 7 away from the outside wall of the tubular section.

This is very important during starting up of the extruder which is producing the tubular section. As soon as a tubular section which meets the desired parameters is extruded, the wall thickness measuring instrument 7 can be moved back against the outside wall of the tubular section 3. If desired, this can even be built into a program of an automatic starting-up procedure of an extruder.

In order to ensure optimum pressing of the wall thickness measuring instrument 7 against the outer wall surface 4 of a tubular section 3, the wall thickness measuring instrument 7 is connected on either side thereof with supporting faces 14 designed in the form of fingers. The position of these fingers 14 relative to one another can vary. By means of a gear wheel-gear rack construction 16, irrespective of the position of the two fingers, the angle α formed by the fingers 14 is always divided into two equal angles by the measuring instrument 7, so that the measuring instrument is always held at right angles to the wall of the tube.

In order to prevent damage to the measuring instrument 7 if the tube should exert too great axial force on the measuring instrument, there is also a fixing element 13 in the form of a magnet, said magnet working in conjunction with the arm 9. Whenever the force exerted by the tubular section on the measuring instrument is greater than the force which the fixing element in the form of magnet 13 can absorb, the arm 9 will be disconnected from the fixing element or magnet 13 and will therefore be moved from the plane at right angles to the tube 8. When the fault which caused the axial force has been eliminated, the arm 9 can return to its position and can be connected by magnet 13, following which the measurement can be resumed.

Finally, FIG. 5 shows an arrangement in which a wall thickness measuring instrument acccording to the invention is being used.

It can be seen that an extruder 1 with an extrusion head 2 is extruding a plastic tubular section 3, which after passing a calibration device 19 is cooled by means of cooling elements 5 which sprinkle cooling water over the tube. The wall thickness measuring instrument 7 measures the wall thickness and, depending on the measured values, the passage into the extrusion head 2 is regulated in order to obtain a tube with a wall thickness which has the desired value over the entire periphery.

The plastic tube 3 is removed by means of a drawbench 6.

The device according to the invention also permits to measure the wall thickness by means of one echo in a very reliable manner. This measurement is executed by maintaining a thin water layer 21 upon the outer wall surface of the pipe emitting an ultrasonic pulse emitted by the head of the measuring device upon the wall of the tube and measuring the time for return of the echo caused by the inner wall of the tube in the measuring device. The difference between the time of emitting the ultrasonic puls and the time of return of the echo is a measure for the wall thickness.

In the device according to the prior art the wall thickness is measured by comparing the time difference between a first echo caused by the outer wall surface of the tube and a second echo caused by the inner wall surface of the tube after the head of the measuring device has emitted an ultrasonic pulse. However, this requires the maintenance of a thick water layer 21 upon the outer wall surface. In the absence of such a thick water layer no echo will be transmitted by the outer wall surface or in the partial absence of the thick water layer the measurements will be wrong.

This problem will not occur in the invention as a thin water layer can be easily maintained compared with the difficult maintenance of a thick water layer as necessary in the prior art.

With the aid of a device for measuring the wall thickness according to the invention, extruded plastics tubular sections, for example made of polyvinyl chloride, polyethylene or polypropylene, can be extruded with very accurate wall thickness, since the wall thickness measuring instrument measures the wall thickness of the extruded tubular section in the optimum manner.

What is claimed is:

1. A device for measuring the wall thickness of an extruded tubular section during extrusion comprising a tubular section thickness measuring instrument rotatably mounted about the periphery of the extruded tubular section, means connected to said instrument causing it to bear against the wall of the extruded tubular section so that during rotation of the instrument over the whole peripheral circumference of said tubular section, said measuring instrument presses against the wall of the extruded tubular section with a substantially uniform force which is perpendicular to and against the wall of the tubular section, said means comprising a pressure element which is hingedly connected by a first hinge connection to an arm which is connected with the measuring instrument and by a second hinge connection to a ring extending perpendicular to the axis of the extruded tubular section.

2. A device according to claim 1, wherein the pressure element is a spring or a two-way operable air cylinder.

3. A device according to claim 1, further comprising a measuring instrument disposed for cooperation with supporting faces which are situated on either side of the measuring instrument and of which the angles $\alpha$ between the two supporting faces and the measuring element can be varied.

4. A device according to claim 1, wherein the measuring instrument is such as to measure thickness by means of one echo returned by the inner wall of the tubular section when an ultrasonic pulse emitted by the measuring instruments hits said inner wall.

5. A device for measuring the wall thickness of an extruded tubular section during extrusion comprising a tubular section thickness measuring instrument which is rotatable around a rotation point, the distance between the measuring instrument and the rotation point being variable, and means connected to said instrument and counteracting the weight of said instrument pressure means connected to said instrument adapted to exert a predetermined force on said instrument in a direction towards the rotation point, such that when said device is mounted on an extrusion apparatus the measuring instrument is rotatable about the periphery of the extruded tubular section and during rotation of the instrument about the whole peripheral circumference of said tubular section the measuring instrument will press against the wall of the extruded tubular section with a substantially uniform force which is perpendicular to the wall of said extruded tubular section.

6. A device for measuring the wall thickness of an extruded tubular section during extrusion comprising a tubular section thickness measuring instrument, said measuring instrument being connected to a free end of an arm which is hingedly connected to a ring which is rotatable around its axis, said arm bearing a balancing weight outside the ring counteracting the weight of said measuring instrument, and with an adjustable pressure element being present to act upon said arm, so that when said device is mounted on an extrusion apparatus such that the plane of the ring is perpendicular to the axis of the tubular section and the ring extends concentrically about said tubular section, during rotation of the instrument over the whole peripheral circumference of said tubular section said measuring instrument can press against the wall of the extruded tubular section with a substantially uniform force which is perpendicular to the wall of said tubular section.

7. A device according to claim 6, wherein said pressure element is hingedly connected by a first hinge connection to the arm being connected with the measuring instrument and by a second hinge connection to the ring extending perpendicular to the axis of the tubular section.

8. A device according to claim 6, wherein the pressure element is a spring.

9. A device according to claim 6, wherein the pressure element is a two-way operable air cylinder.

10. A device according to claim 6, wherein the measuring instrument is coupled with two supporting elements each situated on either side of the measuring instrument and each having supporting faces adapted to bear against the wall of the extruded tubular section, the angles between the two supporting faces and the axis of measuring instrument being equal and adjustable.

11. A device according to claim 6, wherein the measuring instrument is an ultrasonic measuring instrument which measures the wall thickness of an extruded tubular section based on the measurement of the time difference between an ultrasonic pulse emitted by the measuring instrument and the echo returned by the inner wall of the tubular section when an ultrasonic pulse emitted by the measuring instruments hits said inner wall.

12. A device according to claim 6, wherein the arm carrying the measuring instrument is detachably coupled with a retaining element adapted to keep said arm positioned in axial direction of the ring to make it possible to remove the measuring instrument completely from the wall of the tubular section.

13. A device according to claim 12, wherein the retaining element is a magnet.

14. An extrusion apparatus for the extrusion of a tubular section provided with a device for measuring the wall thickness of an extruded tubular section during extrusion, comprising a tubular section thickness measuring instrument which is rotatable around a rotation point lying on or close to the axis of the extruded tubular section, the distance between the measuring instrument and the rotation point being variable, and means connected to said instrument counteracting the weight of said instrument and pressure means connected to said instrument adapted to exert a predetermined force on said instrument in a direction towards the axis of rotation, such that the measuring instrument is rotatable about the periphery of the extruded tubular section and during rotation of the instrument over the whole peripheral circumference of said tubular section said measuring instrument presses against the wall of the extruded tubular section with a substantially uniform force which is perpendicular to the wall of said tubular section.

15. An extrusion apparatus for the extrusion of a tubular section provided with a device for measuring the wall thickness of an extruded tubular section during extrusion comprising a tubular section thickness measuring instrument, said measuring instrument being connected to a free end of an arm which is hingedly connected to a ring which is rotatable around its axis and extending perpendicular to the axis of the tubular section and concentrically about said tubular section, said arm bearing a balancing weight outside the ring counteracting the weight of said measuring instrument, and having an adjustable pressure element to act upon said arm, so that during rotation of the instrument over the whole peripheral circumference of said tubular section said measuring instrument presses against the wall of the extruded tubular section with a substantially uniform force perpendicular to the wall of said tubular section.

* * * * *